(12) United States Patent
Weidinger

(10) Patent No.: US 7,364,026 B2
(45) Date of Patent: Apr. 29, 2008

(54) PRESSURE PLATE ASSEMBLY FOR A FRICTION CLUTCH

(75) Inventor: Reinhold Weidinger, Unterspiesheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 254 days.

(21) Appl. No.: 11/198,549

(22) Filed: Aug. 5, 2005

(65) Prior Publication Data
US 2006/0027436 A1 Feb. 9, 2006

(30) Foreign Application Priority Data
Aug. 6, 2004 (DE) .................. 10 2004 038 266
Feb. 24, 2005 (DE) .................. 10 2005 008 393

(51) Int. Cl.
*F16D 13/75* (2006.01)

(52) U.S. Cl. ........................ 192/111.2; 192/70.252

(58) Field of Classification Search ............ 192/111.2
See application file for complete search history.

(56) References Cited

U.S. PATENT DOCUMENTS

| 6,866,133 | B2 | 3/2005 | Weidinger |
| 2002/0079187 | A1 | 6/2002 | Weidinger et al. |
| 2004/0069587 | A1 * | 4/2004 | Weidinger ............... 192/70.25 |

FOREIGN PATENT DOCUMENTS

| DE | 101 55 146 | 9/2002 |
| DE | 102 47 013 A | 4/2004 |

OTHER PUBLICATIONS

Search Report dated Nov. 18, 2005 for European Application No. 05016724.6.

* cited by examiner

*Primary Examiner*—Richard M Lorence
(74) *Attorney, Agent, or Firm*—Cohen Pontani Lieberman & Pavane LLP

(57) ABSTRACT

A pressure plate assembly for a friction clutch includes a housing, a pressing plate arranged to rotate with the housing, and a force accumulator arranged to exert an axial force on the pressing plate. A wear take-up element between the accumulator and the pressing plate moves to adjust for wear, and an adjusting member is brought into a take-up starting position when wear occurs and is acted on by centrifugal force in order to carry out an adjusting movement wherein the adjusting member moves out of the take-up starting position. The adjusting member cooperates with the wear take-up element by way of a transmission member which moves with respect to the wear take-up element when the adjusting member is brought into the take-up starting position. During the adjusting movement, the transmission member is acted upon by the adjusting member and moves jointly with the wear take-up element.

15 Claims, 8 Drawing Sheets

PRESSURE PLATE ASSEMBLY FOR A FRICTION CLUTCH

BACKGROUND OF THE INVENTION

1. Field of the Invention

The present invention is directed to a pressure plate assembly for a friction clutch to carry out the adjusting movement.

2. Description of the Related Art

A pressure plate assembly of the type mentioned above is known, for example, from U.S. Pat. No. 6,866,133. In this pressure plate assembly, a ratchet mechanism which is driven by centrifugal force drives a take-up ring in rotation when wear occurs through the action of centrifugal force by an adjusting element and therefore compensates for wear. The adjusting element cooperates with the take-up ring by means of teeth. The movement of the adjusting element into the take-up starting position is made possible in that the teeth at the adjusting element and the teeth at the take-up ring can disengage from one another. For this purpose, the take-up member must be capable of displacement, which carries the risk that the teeth cannot always be made to interact in the correct manner. Further, a leaf spring element is provided which acts on the adjusting element and, when wear occurs, comes into contact with a stop that is fixed with respect to the housing and, in so doing, cancels a clamping of the take-up member so that the latter can attain its take-up starting position It is the object of the present invention to provide a pressure plate assembly of the generic type in such a way that highly reliable operation can be achieved in a simple construction.

SUMMARY OF THE INVENTION

According to the invention, this object is met by a pressure plate assembly for a friction clutch. The plate assembly is provided with a housing arrangement, a pressing plate provided in the housing arrangement so as to rotate together with the latter around an axis of rotation, and a force-exerting arrangement, preferably a force accumulator, which can be supported with respect to the housing arrangement and pressing plate. A wear compensation element including a wear take-up device is mounted along the path of force transmission between the force-exerting arrangement and the pressing plate or housing arrangement. The wear take-up device is configured with at least one wear take-up element which is rotatably movable for the purpose of adjusting for wear by an adjusting member when the latter carries an adjusting movement causing the at least one wear take-up element to move so as to carry out an adjustment for wear. Advantageously, the adjusting member can be moved by centrifugal forces generated during rotation of the housing.

Further, the adjusting member cooperates with the wear take-up element by way of a transmission member. The transmission member is movable with respect to the wear take-up element when wear occurs and when the adjusting member is brought into a take-up starting position and can be acted upon by the adjusting member so as to move jointly with the wear take-up element when carrying out an adjustment for wear and during the adjusting movement of the adjusting member out of the take-up starting position.

Accordingly, in the construction according to the invention, the interaction between the adjusting member and the wear take-up element is realized by a transmission member which can always reliably cooperate with the adjusting member and, depending on the type of movement, is movable with the wear take-up element, or with respect to the latter, to prepare for a subsequent wear take-up adjustment.

In this regard, it is suggested that the transmission member can be locked for wear take-up at the wear take-up element. Preferably, this locking can be achieved in that the transmission member can be brought into a frictional clamping fit at the wear take-up element by means of the adjusting member.

In order to prepare for a take-up process, i.e., in order to bring the adjusting member into its take-up starting position, it is suggested that a pretensioning member is provided for pretensioning the adjusting member in direction of the take-up starting position. An additional function can be integrated within this pretensioning element in that the pretensioning element acts on the transmission member for disengaging the frictional clamping fit and for moving the transmission member with respect to the wear take-up element. For example, the pretensioning member can act on the adjusting member by way of the transmission member for this purpose.

The adjusting member can preferably be carried at the pressing plate so as to be swivelable. This is advantageous particularly when the wear take-up device lies in the path of force transmission between the pressing plate and the force-exerting arrangement.

To ensure that wear take-up occurs only when it is actually required, it is suggested that a blocking device be associated with the adjusting member, which blocking device releases the adjusting member upon the occurrence of wear that must be compensated, allowing it to move into the take-up starting position.

For example, the blocking device can comprise a blocking member which is pretensioned in a blocking position and which can be brought into a release position when wear occurs that must be compensated. The blocking member can be swivelable at the pressing plate between the blocking position and the release position.

The blocking and locking of the take-up element can be carried out, for example, in that the blocking device clamps the adjusting member in the blocking position to prevent it from moving into the take-up starting position. This clamping can be carried out, for example against the force-exerting arrangement.

In order to ensure that the adjusting member can be moved into its take-up starting position when wear occurs, it is suggested that the blocking device can be brought into the release position by a subassembly that shifts in position, depending upon wear, with respect to the take-up element when wear occurs. For example, a movement of the force-exerting arrangement occurring as a result of wear can be sensed for this purpose. Further, the subassembly can comprise the housing arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENT

Figure 1:
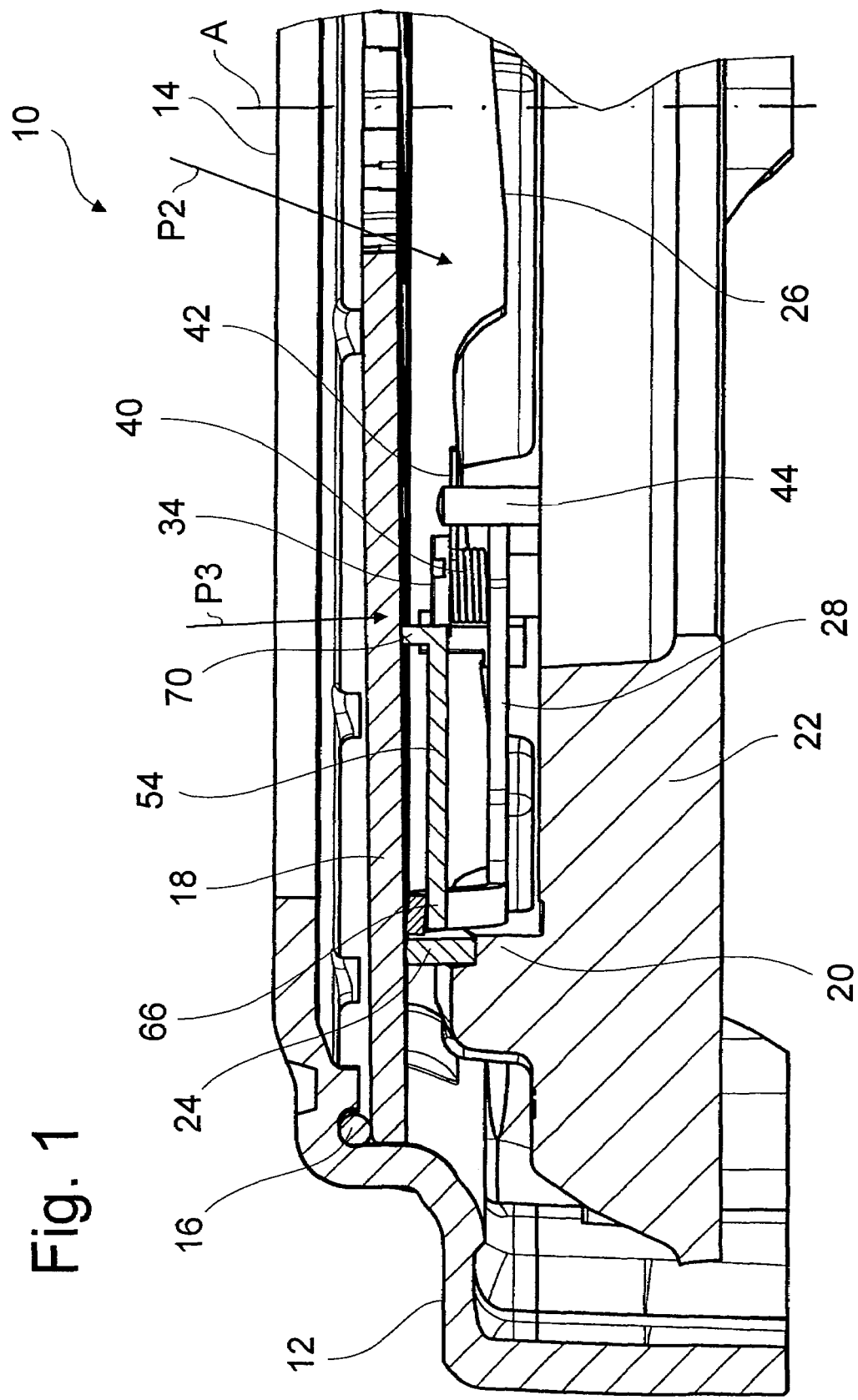
FIG. 1 shows a partial longitudinal section through a pressure plate assembly according to the present invention.

A pressure plate assembly according to the invention is designated generally by 10 in FIG. 1. This pressure plate assembly 10, which is provided for a pull-type clutch, comprises a housing 12 which is constructed, in a manner known per se, for coupling with a flywheel mass, that is, for example, a flywheel, dual-mass flywheel, or the like. At a bottom area 14 of the housing 12, a force-accumulator 18 constructed, e.g., as a diaphragm spring or the like which is supported in the radial outer area by a supporting ring 16 formed of wire material. This force accumulator 18 acts on a pressing plate 22 farther inward radially, with respect to the axis of rotation A of the pressure plate assembly 10, by means of a wear take-up device 20. The force accumulator 18 can be engaged in a pulling manner in the inner area thereof so that it is loaded opposite to its pretensioning action so that the pressure plate assembly 10 and the friction clutch constructed therewith are released. It will be noted that a force accumulator 18 of this kind need not necessarily act as a force-exerting arrangement. In a normally-open friction clutch, this force-exerting arrangement could also be a lever arrangement which is loaded by an actuator arrangement for generating an engagement force.

The wear take-up device 20 comprises a take-up ring 24 in the path of force transmission between the force accumulator 18 and the pressing plate 22. This take-up ring 24 is loaded by the force accumulator 18 and contacts the pressing plate 22 by means of a ramp surface arrangement 26. As the result of a circumferential rotation of the take-up ring 24, the surface of the take-up ring 24, loaded by the force accumulator 18, shifts with respect to the pressing plate 22 in such a way that the total axial thickness of the subassembly formed by the pressing plate 22 and take-up ring 24 increases accordingly.

The wear take-up device 20 further comprises an adjusting member 28. This adjusting member 28 lies on the radial inner side of the take-up ring 24 and is supported in its circumferential end area 30 by a screw bolt member 34 or the like at the pressing plate 22 so as to be swivelable around a swiveling axis extending substantially parallel to the axis of rotation A.

Figure 5:
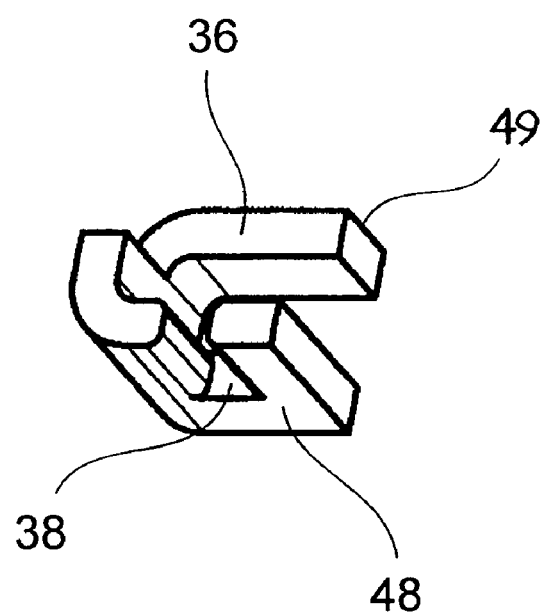
FIG. 5 is a perspective view of a transmission member.

A substantially U-shaped transmission member 36, which is shown in perspective in FIG. 5, is positioned in such a way that the take-up ring 24 engages in a slot-shaped cutout 38 of the transmission member 36. The take-up ring 24 has some movement play in the slot-shaped cutout so that the transmission member 36 can, in principle, tip slightly with respect to the take-up ring 24. A leg spring 40 is arranged with its helically wound body area surrounding the bolt 34 and is supported by its leg 42 at an abutment 44 formed at the pressing plate 22, while its other leg 46 loads the transmission member 36. Since the transmission member 36 is formed in a U-shape and has two U-legs 48, 49 lying under the take-up ring 24, it is ensured that the transmission member 36 is tilted approximately around an axis extending substantially parallel to the axis of rotation A by the loading of the leg spring 40.

The adjusting member 28, which is elongated in circumferential direction, has in its end area 30 a shoulder 50 that is eccentric with respect to its swiveling axis. With this shoulder 50, it acts upon the U-leg 48 of the transmission member 36 in a direction opposite to that in which the same U-leg 48 is loaded by the leg 46 of the leg spring 40. This means that the U-leg 48 of the transmission member 36 is pressed against the shoulder 50 of the adjusting member 28 by the loading action of the leg spring 40.

Figure 6:
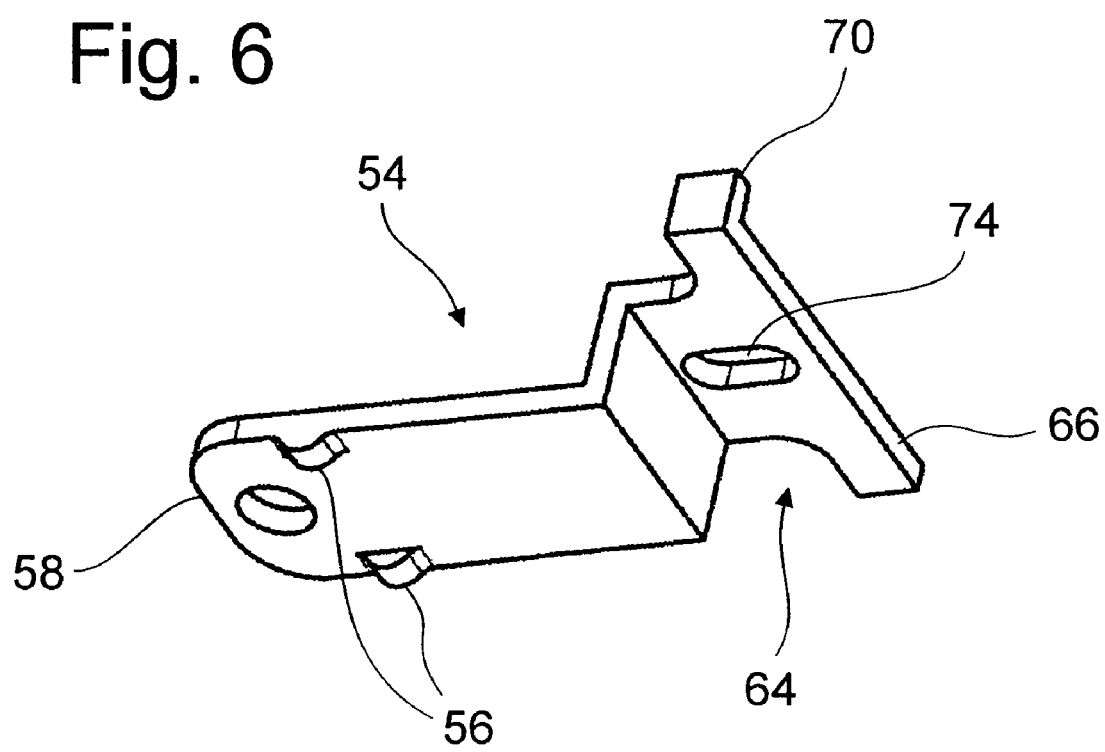
FIG. 6 is a perspective view of a blocking member.

Further, a blocking device, designated generally by 52, is associated with the adjusting member 28. This blocking device 52 comprises a blocking member 54 constructed as a tilting lever. The blocking member 54 shown in FIG. 6 is supported at the pressing plate 22 by two supporting projections 56 which accordingly define a tilting axis. A bolt 60 penetrates the blocking member 54 at one end area 58. A pretensioning spring 62, for example, a helical compression spring, acts between this end area 58 of the blocking member 54 and the expanded head area of this bolt 60. Functionally, this pretensioning spring 62 (FIG. 4) loads the end area 58 of the blocking member 54 so that the other end area 64 of the blocking member 54 is loaded axially away from the pressing plate 22 and toward the force accumulator 18. At this end area 64, the blocking member 54 has a blocking portion 66 that extends radially outward so that it overlaps a counter-blocking portion 68 of the take-up member 28 (FIG. 4) and presses the latter toward or against the force accumulator 18. Further, a detection portion 70 is provided at the blocking member 54 in the end area 64. This detection portion 70 must be angled in the direction of the force accumulator 18, but in the normal state, in which there is no wear or no excessive wear, is at a distance from the force accumulator 18 in every operating situation. To prevent an unwanted swiveling of the blocking member 54, a retaining pin 72 is provided at the pressing plate 22 and penetrates an elongated cutout 74 in the end area 64 of the blocking member 54. Accordingly, the blocking member 54 can carry out a tilting movement in the area of its two projections 56, but cannot otherwise be rotated or swiveled.

Figure 2:
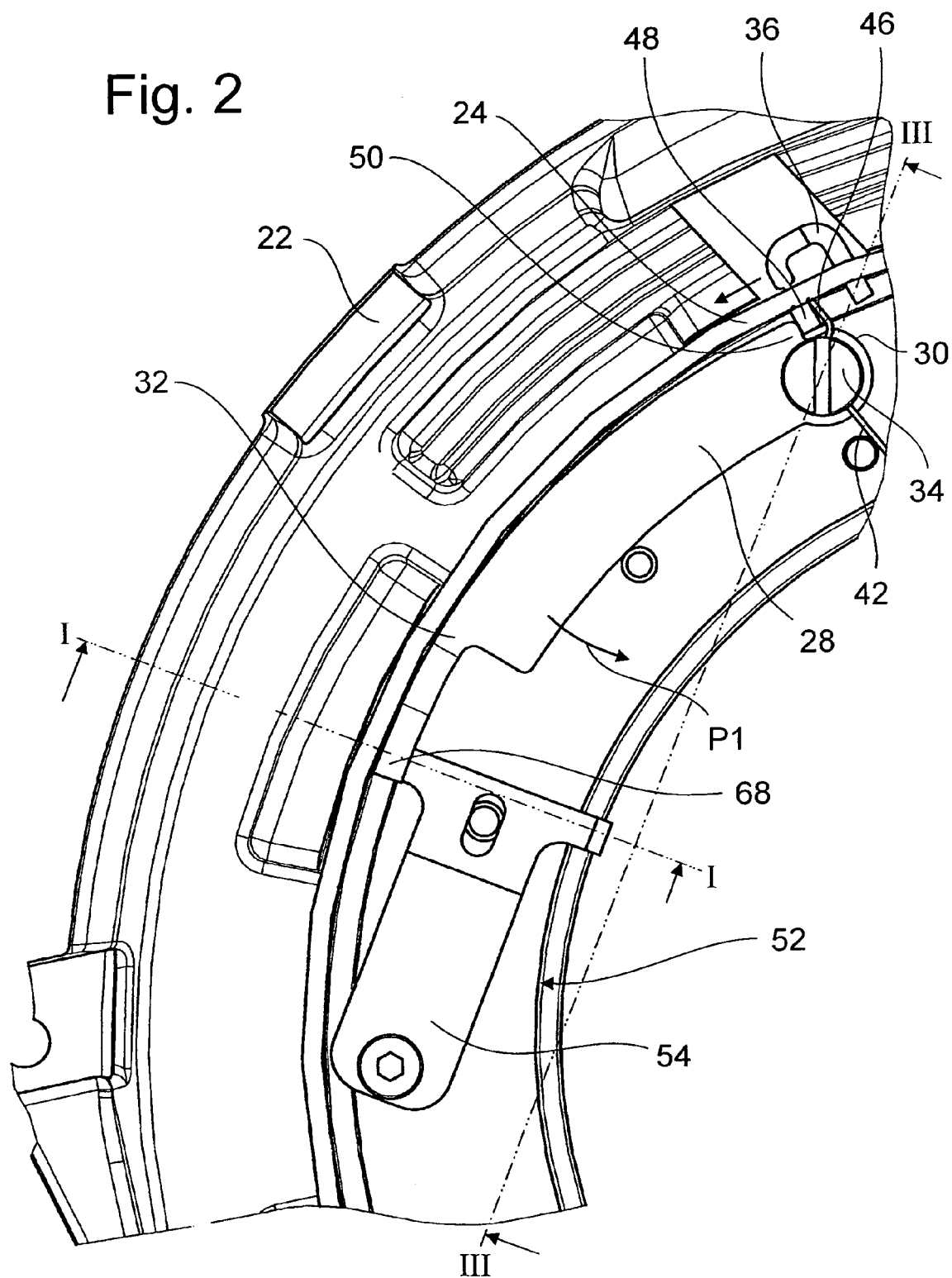
FIG. 2 shows a partial axial view of the essential components of the pressure plate assembly according to the present invention.
Figure 3:
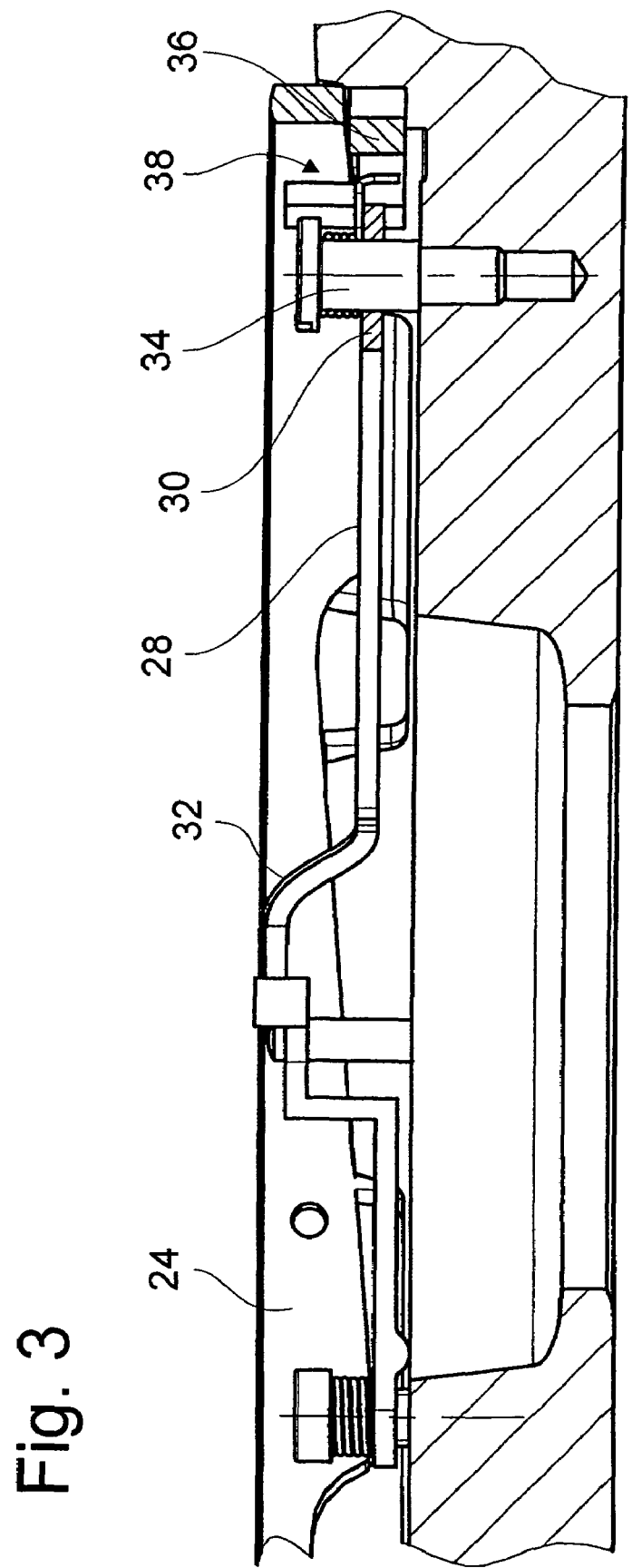
FIG. 3 shows a sectional view of the components shown in FIG. 2 in section along line III-III in FIG. 2.
Figure 4:
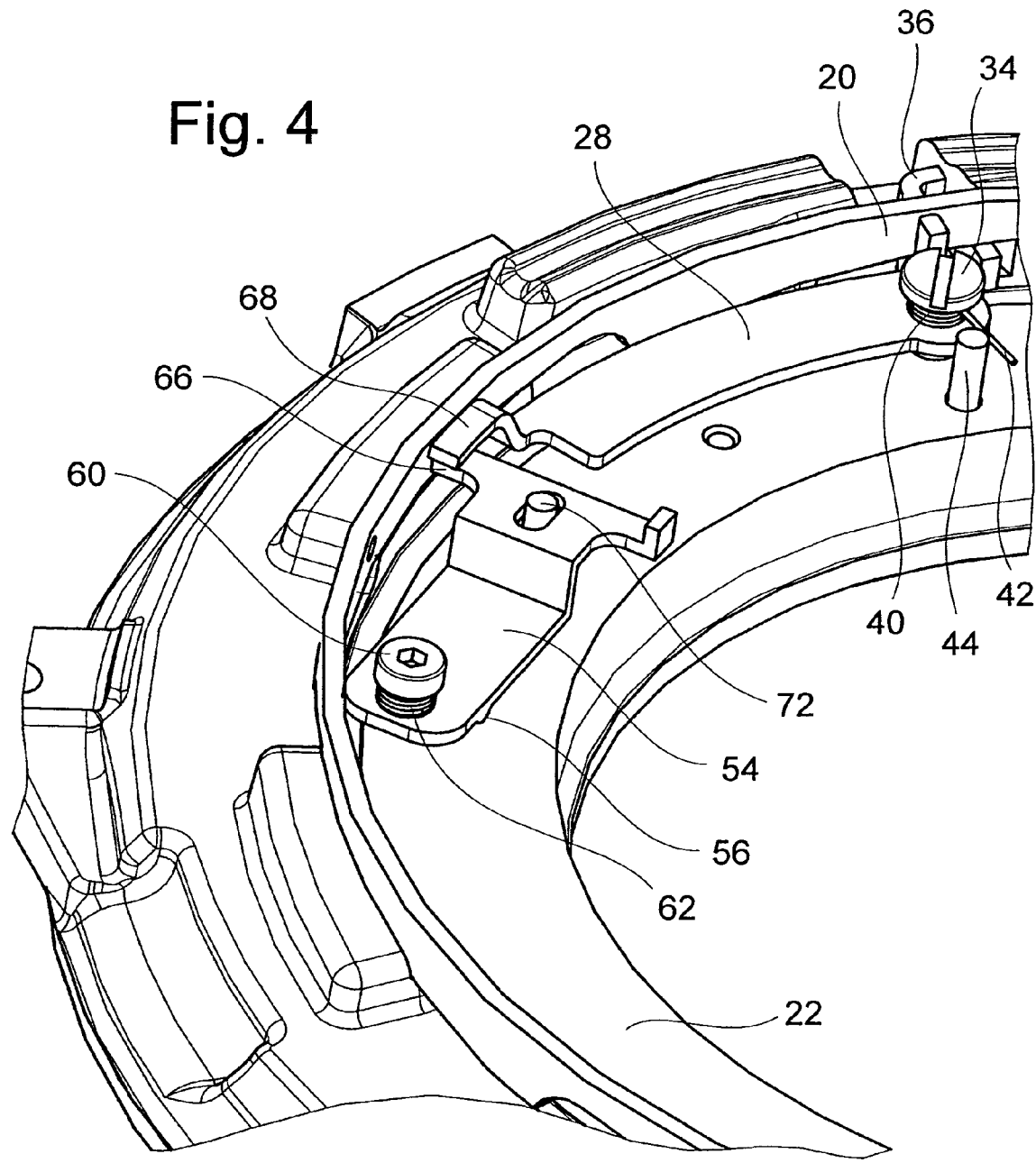
FIG. 4 is a perspective view of the components shown in FIGS. 2 and 3.

The pressure plate assembly, the construction of which was described above in detail, operates in the following manner:

In the absence of wear, the various subassemblies of the wear take-up device 20 are in the state that is illustrated in particular in FIGS. 2 and 4. This means that the adjusting member 28 is also loaded radially outward by centrifugal force in particular, namely, opposite to the load which is exerted upon it by the leg spring 40 via the transmission member 36 and which, in principle, pretensions it radially inward as is illustrated by arrow P1 in FIG. 2. To prevent a swiveling of the take-up member 28 radially inward also in the stationary state, that is, in the absence of loading by centrifugal force, the blocking member 54 presses against the force accumulator 18 (FIGS. 1) with its blocking portion 66 and counter-blocking portion 68 so that the adjusting member 28 is, in principle, locked in the position shown in FIGS. 2 and 4.

Figure 7:
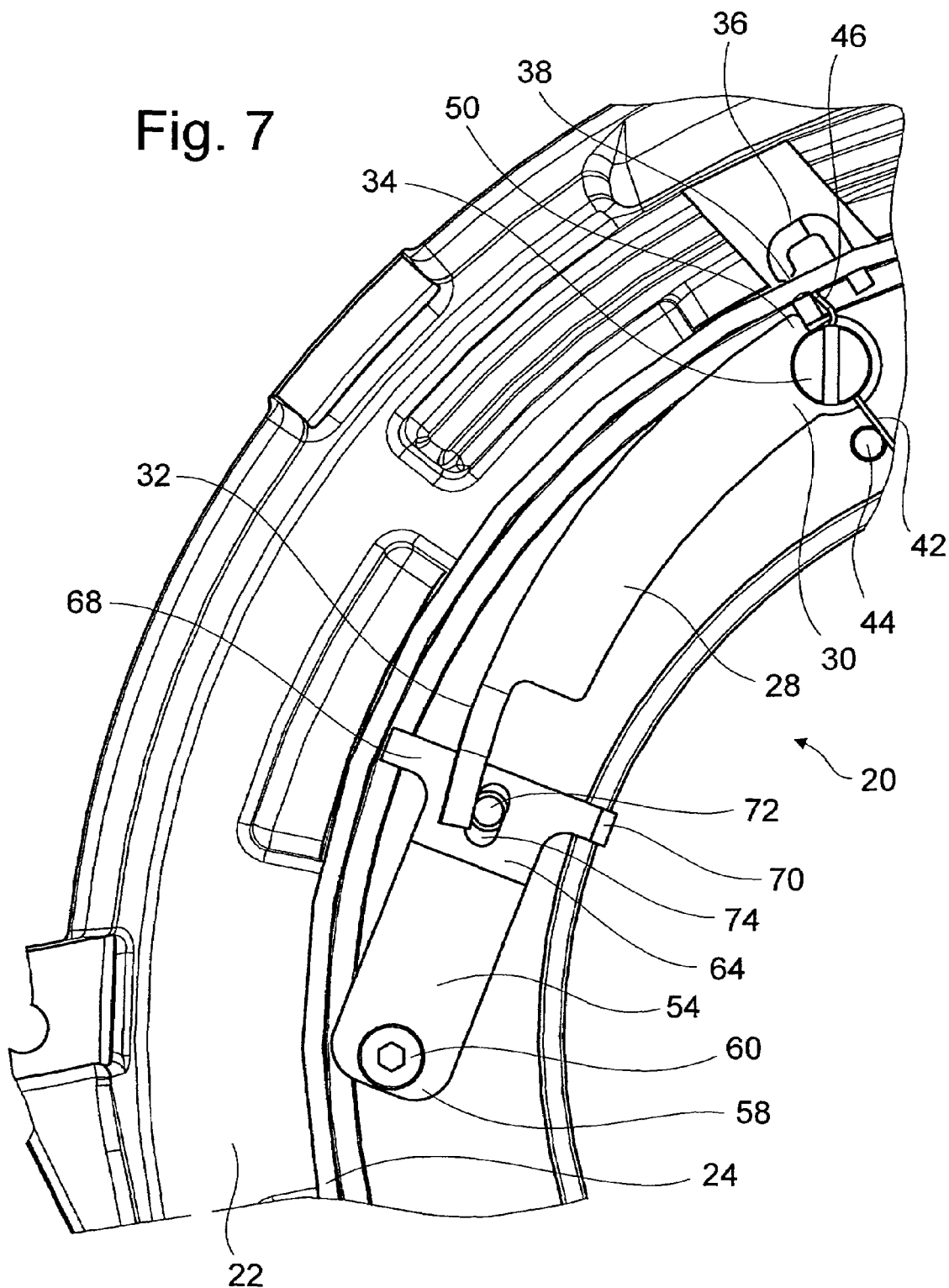
FIG. 7 is a view corresponding to FIG. 2 with the adjusting member in a take-up starting position.

When wear occurs, for example, in the friction linings of a clutch disk, not shown, the pressing plate 22 can shift closer to the flywheel mass, not shown, in the engaged state; that is, it changes its position relative to the housing 12. This results in a greater relaxing of the force accumulator 18, constructed in this instance as a diaphragm spring, with the result that the latter moves closer to the pressing plate 22 in the radial inner area as is illustrated by arrow P2 in FIG. 1. When a certain degree of wear has been reached or exceeded, the force accumulator 18 makes contact with the detection portion 70 (FIG. 4) of the blocking member 54 and accordingly loads it opposite to the pretensioning action of the spring 62 in the direction indicated by arrow P3 (FIG. 1). As a result, the blocking portion 66 of the blocking member 54 releases the counter-blocking portion 68 of the adjusting member 28 which is no longer locked in the position shown in FIG. 4. However, since wear generally occurs only in this rotary operation of a pressure plate assembly 10 of this type, the action of centrifugal force will in this situation, in principle, continue to hold the adjusting member 28 in its radial outer position, e.g., contacting the inner side of the wear take-up ring 24. However, if the system should later come to a stop, there is no longer any centrifugal force present which would pretension the adjusting member 28 radially outward against the action of the leg spring 40. Since the pressure plate assembly 10 is held in its engaged position also in the stationary state in principle, that is, when the vehicle is stopped, the blocking member 54 is then also loaded in such a way that it no longer presses the counter-blocking portion 68 against the force accumulator 18. The leg spring 40 can then swivel the adjusting member 28 so that the adjusting member 28 moves in the direction away from the take-up ring 20 and reaches the take-up starting position shown in FIG. 7. This is determined by the pin 72 which not only secures the blocking member 54 against unwanted swiveling, but also provides a radial inner stop for the adjusting member 28. During this swiveling movement, the transmission member 36 follows the shoulder 50 of the take-up member 28 moving in circumferential direction around the bolt 34 so that it moves slightly in circumferential direction with respect to the take-up ring 24 under loading by the leg 46.

When the system is subsequently started again, i.e., when an internal combustion engine, for example, is started and the pressure plate assembly 10 is therefore also driven again in rotation around the axis of rotation A, a centrifugal force acts upon the adjusting member 28 while the pressure plate assembly 10 is still in the engaged state. Since the blocking member 54 is still in its released position due to the interaction of the detection portion 70 with the force accumulator 18, the adjusting member 28 is not locked in the position shown in FIG. 7 and it can now shift radially outward again, i.e., it can swivel around the bolt 34. The swiveling only occurs when the clutch is actuated. This swiveling movement proceeds opposite to the pretensioning action of the leg spring 40 and tensions the latter by means of the U-leg 48 of the transmission member 36. Accordingly, the transmission member 36 is loaded again in circumferential direction during this swiveling movement and tilts slightly with respect to the take-up ring 24, so that the latter is now clamped in the cutout 38 of the transmission member 36. In this situation, a frictional clamping fit is produced between the transmission member 36 and the take-up ring 24 so that the take-up ring 24 is driven together with the transmission member 36 for corresponding movement in circumferential direction by the continued swiveling of the adjusting member 28 due to centrifugal force. This movement continues until the adjusting member 28 again contacts the radial inner side of the take-up ring 24 and is in its position shown in FIG. 4. Due to the action of the ramp surface arrangement 26, which was already mentioned, the rotation or circumferential shifting of the take-up ring 24 results in the subassembly formed of the take-up ring 24 and the pressing plate 22 increasing its total axial thickness, specifically to a corresponding extent for compensating for the swiveling of the take-up member 28. This means that every swiveling movement of the adjusting member 28 between its take-up starting position, shown in FIG. 7, and its basic position, shown, e.g., in FIG. 4, leads to a compensation of wear to an extent that is also defined by the slope of the ramp surface arrangement 26.

After the wear take-up process has been carried out in this manner and the adjusting member 28 is again in its radial outer position, the force accumulator 18 can no longer interact with the detection portion 70 at the blocking member 54, so that the latter can resume its blocking position in which it can press the counter-blocking portion 68 against the force accumulator 18 and therefore block the adjusting member 28 from swiveling radially inward.

A very simply constructed and reliably operating mechanism for wear compensation is provided in this pressure plate assembly according to the invention. It is significant that the take-up movement, particularly that of the take-up ring 24, is not induced by spring biasing, but rather is actively driven by means of the adjusting member 28. Accordingly, there are no spring elements or the like that pretension the take-up ring 24 in circumferential direction, so that the risk of fatigue of such structural component parts can be eliminated. The inclination of the ramp surface arrangement 26 can prevent the take-up ring 24 from rotating back. Further, since the swiveling movement of the adjusting member 28 is limited on the radial outer side by the take-up ring 24 itself, undefined swiveling and adjusting can be entirely ruled out.

Figure 8:
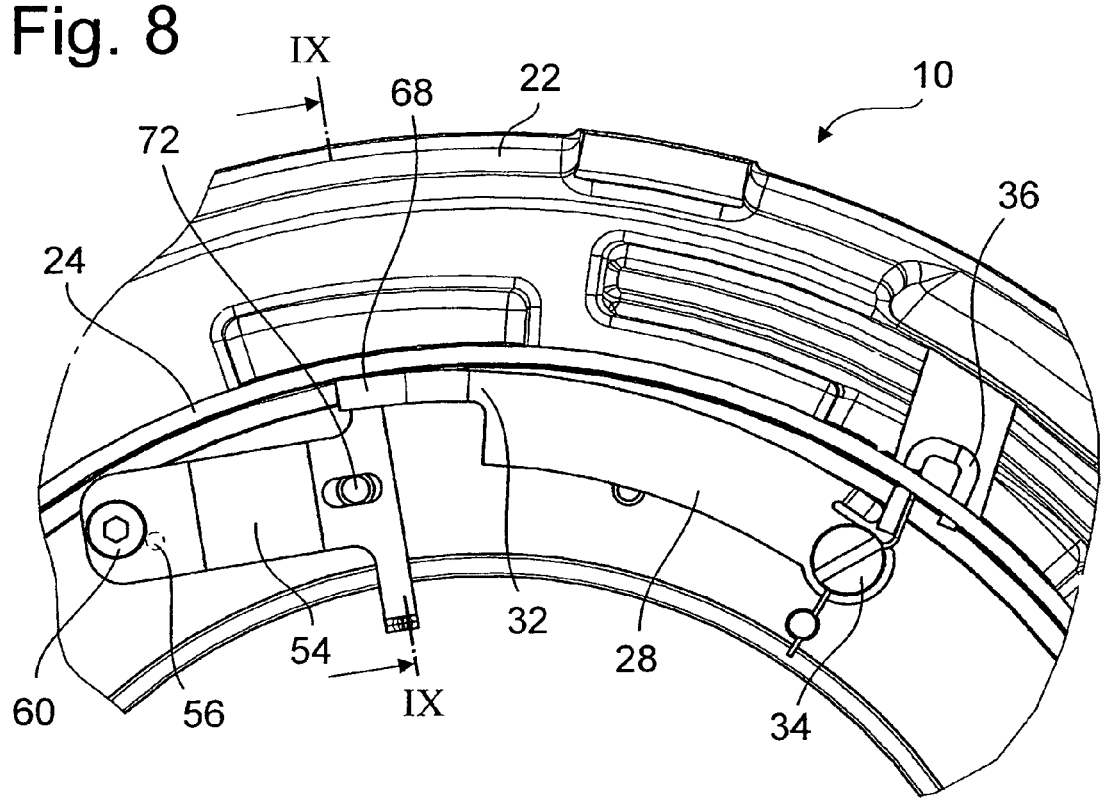
FIG. 8 is a view corresponding to FIG. 2 showing an alternative embodiment form.
Figure 9:
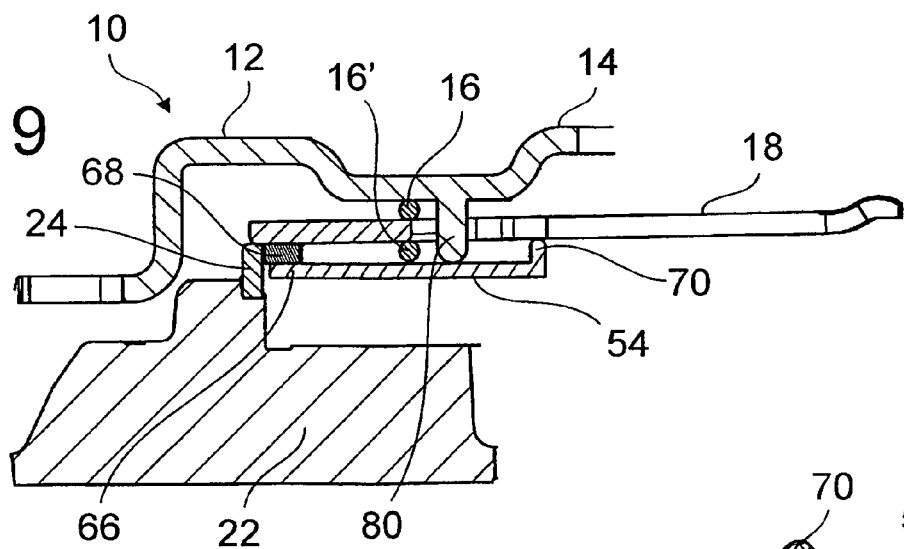
FIG. 9 is a sectional view corresponding to FIG. 8 in section along a line IX-IX in FIG. 8.
Figure 10:
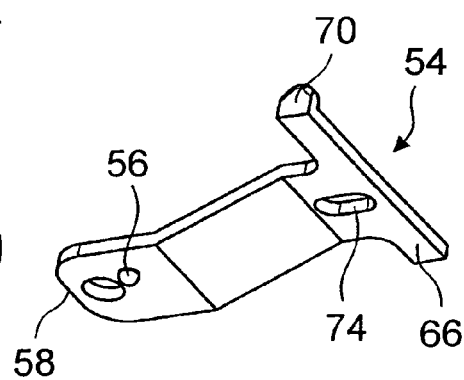
FIG. 10 is a perspective view of the blocking member used in the embodiment form according to FIG. 8.

FIGS. 8 to 10 show an embodiment form of the pressure plate assembly 10, according to the invention, for a push-type clutch. Accordingly, when the constructional variant of the force accumulator 18 described above is acted upon in a pulling manner in the radial inner area for disengagement, that is, when it is acted upon by a force that pulls the force accumulator 18 away in the direction of the pressing plate 22, the force accumulator 18 in the pressure plate assembly 10, shown in FIGS. 8 and 9, for a push-type clutch is acted upon in a pushing manner in its radial inner area to carry out a disengagement process. By pushing is meant in this connection that a force is applied in the direction of the pressing plate 22.

It will be noted, first, that the force accumulator 18 is supported axially by two supporting rings 16, 16' and is held, e.g., by spacer bolts or the like, not shown, at the bottom area 14 of the housing 12. The force accumulator 18 acts upon the take-up ring 24 by an area located outside of this support, with reference to the housing 12, and presses it against the pressing plate 22. The pressing plate 22 is accordingly pressed in direction of a clutch disk or a flywheel mass.

A movement stop 80 is provided at the bottom area 14 of the housing 12 and associated with the blocking member 54 whose detection portion 70 contacts the force accumulator 18 in its area on the radial inner side of the support at the housing 12. This projection-like movement stop 80 extends approximately axially from the bottom area 14 and penetrates the force accumulator 18, for example, between two spring tongues extending radially inward or in the area of a through-opening which is provided additionally for this purpose. Accordingly, the free end of the movement stop 80 provided for cooperating with the blocking member 54 contacts the axial side of the force accumulator 18 remote of the bottom area 14.

Further, it will be seen in FIGS. 8 and 10 that the supporting member 54 in this constructional variant has only one supporting projection 56 which is offset radially inward with reference to a line passing through the bolt 60 and the retaining pin 72. Accordingly, the force generated by the pretensioning spring 62 not only allows the blocking member 54 to take effect with its blocking portion 66 and its detection portion 70, but also generates a tilting moment as a result of which the detection portion 70 is pressed more firmly against the force accumulator 18.

In the absence of wear or when wear has already been compensated, the movement stop 80 does not make contact with the blocking member 54 when engagement and release processes are carried out, so that the relative position of the blocking portion 66 and of the detection portion 70 does not change with respect to the force accumulator 18. In this case, a lighter contact between the movement stop 80 and the blocking member 54 may be accepted if necessary.

When wear occurs, the pressing plate 22 moves closer to the flywheel mass and farther away from the housing 12 in the engaged state. Referring to FIG. 9, this means that the force accumulator 18 is likewise moved in the direction away from the bottom area 14 of the housing 12 by its radial outer area, while the area located on the radial inner side of the retaining rings 16, 16' approaches the bottom area 14. In the course of this approach, however, the movement stop 80 takes effect for the blocking member 54 so that the latter is now lifted from the counter-blocking portion 68 by its blocking portion 66. Because of the above-mentioned lateral positioning of the individual supporting projection 56, the contact between the detection portion 70 and the force accumulator 18 can be maintained in this phase.

This state, in which the counter-blocking portion 68 of the adjusting member 28 is no longer blocked, will also exist in the stationary state when the clutch is engaged, so that the adjusting member 28 can again swivel inward under the pretensioning action of the leg spring 40 until it contacts the retaining pin 72. When putting back in operation subsequently, the adjusting member will swivel radially outward again opposite the pretensioning action of the leg spring 40 and accompanied by the shifting of the transmission member 36 during initial disengagement, that is, when the force accumulator 18 lessens or ceases its action on the take-up ring 24, and will rotate the take-up ring 24. In this way, the wear that had previously occurred and that was sensed by the cooperation of the movement stop 80 and the blocking member 54 is compensated.

Figure 11:
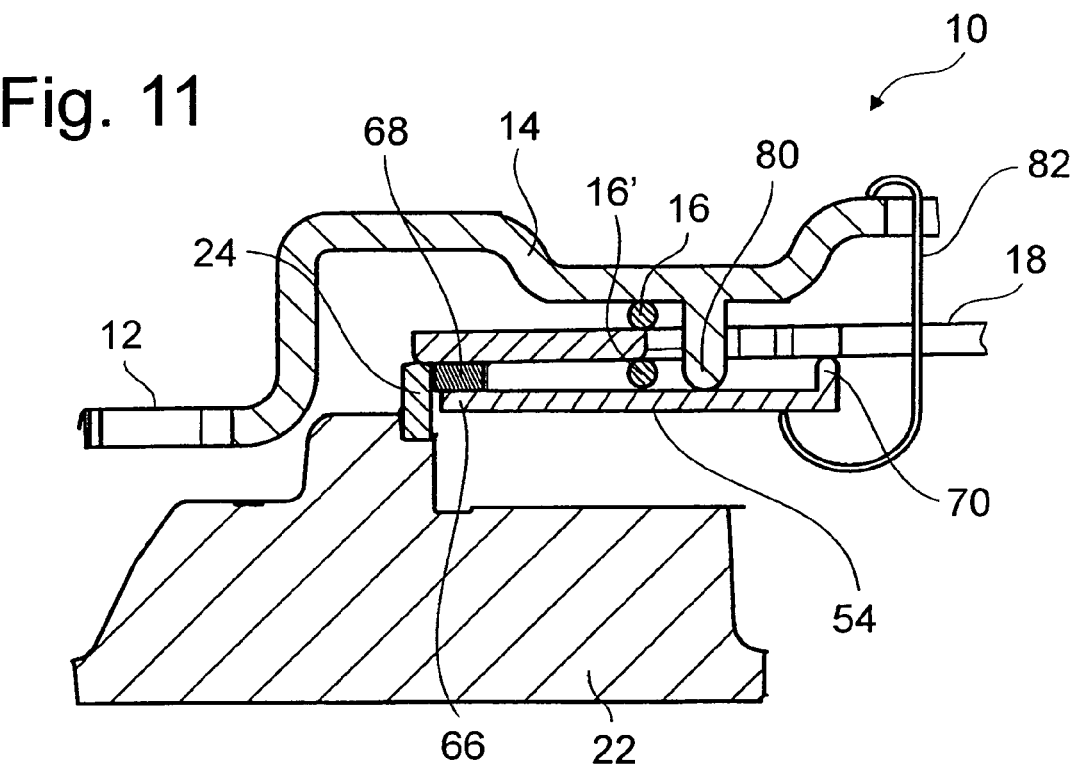
FIG. 11 is a view corresponding to FIG. 9 showing another alternative embodiment form.

FIG. 11 shows a modification of the pressure plate assembly 10 described above, wherein the force pretensioning the blocking member 54 in the direction of the force accumulator 18 is generated differently. In this case, a clamp element 82, e.g., in the form of a spring clip, acts at the bottom area 14 of the housing 12 on one side and at the blocking member 54 on the other side. This clamp element 82 generates a tilting moment which ensures that the blocking portion 66 presses the counter-blocking portion 68 against the force accumulator 18 due to the support of the blocking member 54 by the detection portion 70 at the force accumulator 18. When the movement stop 80 at the housing 12 takes effect, a counter-moment is generated which in turn causes the blocking portion 66 to be lifted from the counter-blocking portion 68. Since the radial inner area of the force accumulator 18 and, therefore, also the area of the blocking member 54 making contact in this area are moved axially when engaging and releasing processes are carried out, the clamp element 82 must have an elasticity that permits this movement to be carried out because of the support of the clamp element 82 with respect to the bottom area 14 of the housing 12, which bottom area 14 does not move axially.

Figure 12:
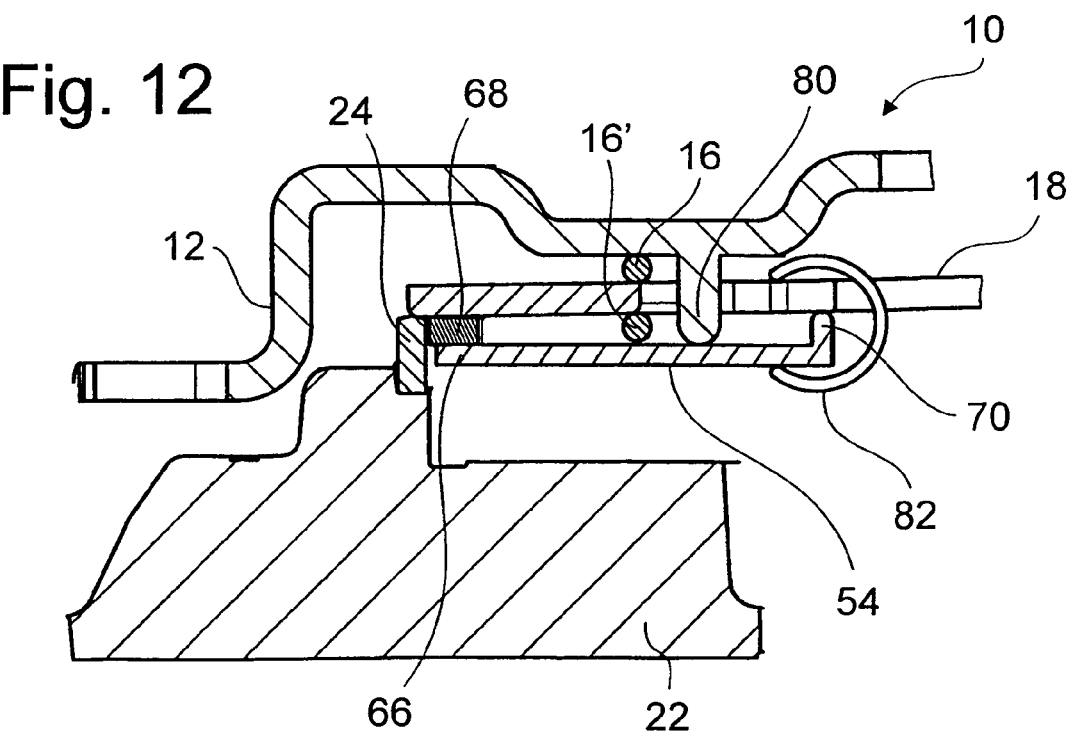
FIG. 12 is another view of an alternative embodiment form corresponding to the view in FIG. 9.

In the variant shown in FIG. 12, this clamp element 82 is supported with respect to the force accumulator 18 rather than with respect to the housing 12 and engages behind the force accumulator 18 at its side remote of the blocking member 54. The clamp element 82 functions in the same way as described above. In this construction variant, the clamp element 82 can have less flexibility, for example, since the axial movement occurring between the blocking member 54 and the force accumulator 18 will be less than the axial movement of the force accumulator 18 with respect to the housing 12.

It will be seen from the preceding description that the essential function of the wear sensing arrangement in the construction variants shown in FIGS. 8 to 12 is carried out by means of the cooperation of the movement stop 80 and the blocking member 54.

Finally, it is noted that the principles of the present invention can be used not only in the normally-closed clutches or normally-closed pressure plate assemblies shown herein, but also in normally-open clutches or multiple-disk clutches or dual clutches.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A pressure plate assembly for a friction clutch, the assembly comprising:
   a housing;
   a pressing plate arranged to rotate with the housing about an axis of rotation;
   a force exerting arrangement supported with respect to the housing and arranged to exert an axial force on the pressing plate along a path of force transmission; and
   a wear take-up arrangement in the path of force transmission between the force-exerting arrangement and the pressing plate, the arrangement comprising a wear take-up element which is movable to adjust for wear;

an adjusting member which is brought into a take-up starting position when wear occurs and can be acted on by centrifugal force in order to carry out an adjusting movement wherein the adjusting member moves out of the take-up starting position; and a transmission member which is movable with respect to the wear take-up element when the adjusting member is brought into the take-up starting position and, during the adjusting movement, is acted upon by the adjusting member and moves relative to the adjusting member jointly with the wear take-up element to cause the wear take-up element to carry out an adjustment for wear.

2. The pressure plate assembly of claim 1 wherein the transmission member can be locked to the take-up element when the take-up element carries out an adjustment for wear.

3. The pressure plate assembly of claim 2 wherein the transmission member can be brought into a friction clamping fit with the wear take-up element by the adjusting member during the adjusting movement.

4. The pressure plate assembly of claim 3 further comprising a pre-tensioning member which loads the adjusting member toward the take-up starting position, wherein the pre-tensioning member acts on the transmission member to disengage the frictional clamping fit so that the transmission member can move with respect to the wear take-up element.

5. The pressure plate assembly of claim 4 where the pre-tensioning member acts on the adjusting member by way of the transmission member.

6. The pressure plate assembly of claim 1 further comprising a pre-tensioning member which loads the adjusting member toward the take-up starting position.

7. The pressure plate assembly of claim 1 wherein the adjusting member is carried by the pressing plate and can be swiveled with respect to the pressing plate.

8. The pressure plate assembly of claim 1 further comprising a blocking device which releases the adjusting member upon the occurrence of wear which must be compensated, whereby the adjusting member can move into the take-up starting position.

9. The pressure plate assembly of claim 8 wherein the blocking device comprises a blocking member which is loaded toward a blocking position and can move into a release position upon the occurrence of wear which must be compensated.

10. The pressure plate assembly of claim 9 wherein the blocking member is tiltable between the blocking position and the release position.

11. The pressure plate assembly of claim 9 wherein the blocking member, in the blocking position, clamps the adjusting member to prevent it from moving to the take-up starting position.

12. The pressure plate assembly of claim 11 wherein the blocking member clamps the adjusting member against the force exerting arrangement.

13. The pressure plate assembly of claim 9 comprising a subassembly that shifts in position with respect to the adjusting member and brings the blocking member into the release position when wear occurs.

14. The pressure plate assembly of claim 13 wherein the subassembly comprises the force exerting arrangement.

15. The pressure plate assembly of claim 13 wherein the subassembly comprises the housing.

\* \* \* \* \*